Dec. 23, 1924.  1,520,061
G. R. KELLY
HORSE COLLAR
Filed Aug. 9, 1923  2 Sheets-Sheet 1
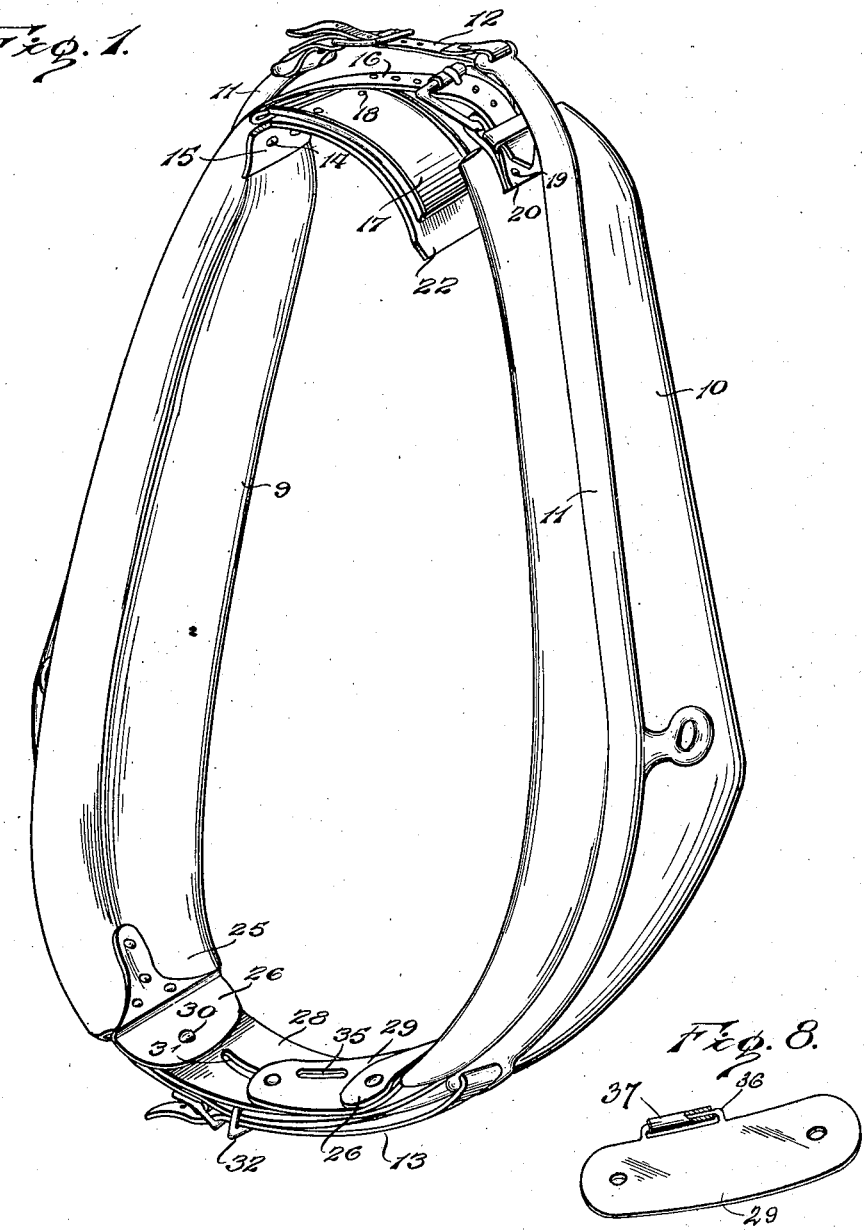

Dec. 23, 1924.
G. R. KELLY
HORSE COLLAR
Filed Aug. 9, 1923
1,520,061
2 Sheets-Sheet 2
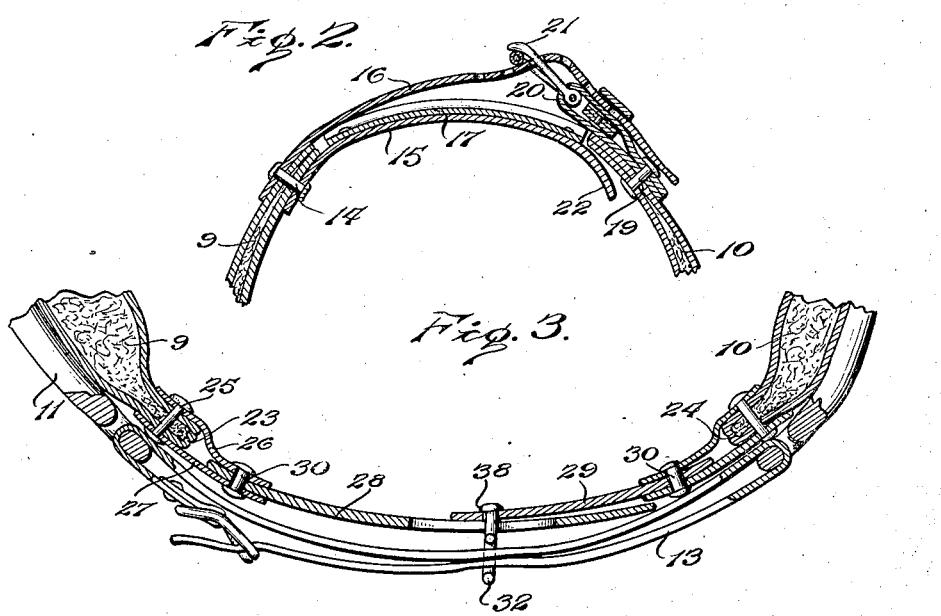
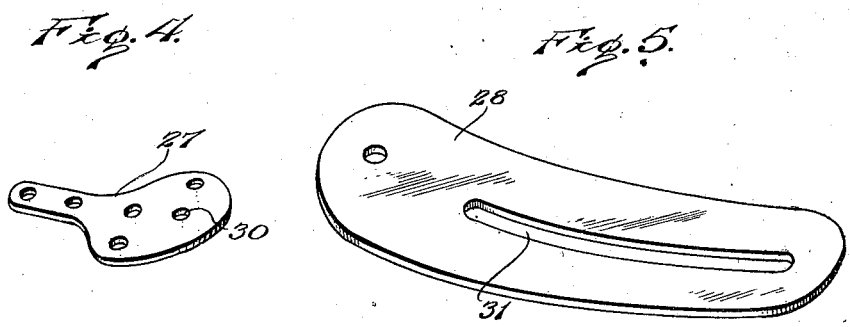
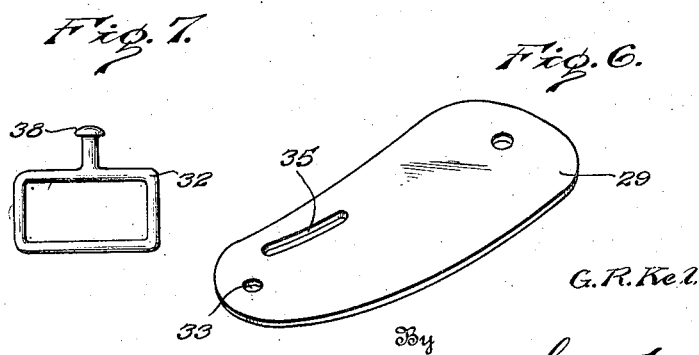
Inventor
G. R. Kelly
By
Larry Lacey, Attorney Patented Dec. 23, 1924.

1,520,061

UNITED STATES PATENT OFFICE.

GEORGE R. KELLY, OF DOVER, MISSOURI.

HORSE COLLAR.

Application filed August 9, 1923. Serial No. 656,596.

*To all whom it may concern:*

Be it known that I, GEORGE R. KELLY, a citizen of the United States, residing at Dover, in the county of Lafayette and State of Missouri, have invented certain new and useful Improvements in Horse Collars, of which the following is a specification.

My invention relates to improvements in horse collars, and the main object of the invention is to furnish fastening means for the collar, which is intended to open at the bottom instead of at the top as is most usual.

Another object of the invention is to provide a flexible connection at the top between the collar pads and adjustable to horses of different sizes.

One advantage of the use of this collar is that it will fit the neck of a horse whether large or small on account of the adjustment afforded at the top and bottom of the collar. It can also be adjusted to fit both shoulders of the horse even if they slope at different angles.

This fastening means may be used not only on new collars, but may also be applied to old ones, particularly those that have been broken at the bottom.

Another advantage is to increase the pulling power of the horse by making the collar fit close up to the side of the horse's neck and not bearing on the point of the shoulder, and the collar will not interfere with the free movement of the shoulders of the horse.

By providing a hinge at the top of the collar, breaking at this point is prevented.

In ordinary collars, the connecting straps are generally furnished at the top, with a stiff connection at the bottom. This causes the collar to break at the bottom, which is now obviated in the present invention as the collar is intended to be opened at the bottom instead of at the top when put on the horse, thus providing a flexible connection at the lower end of the collar instead of a comparatively stiff one which is apt to break.

In the accompanying drawings, one embodiment of the invention is illustrated; and—

Figure 1 is a perspective view of the collar assembled;

Figure 2 is a transverse section of the flexible connection at the top of the collar;

Figure 3 is a transverse section of the lower end of the collar illustrating the adjustable securing means;

Figure 4 is a perspective view of one of the connecting plates;

Figure 5 is a perspective view of one of the hinged links used at the bottom of the collar;

Figure 6 is a corresponding hinged link secured on the other side of the bottom connection;

Figure 7 is a front elevation of a loop for the attaching straps; and

Figure 8 is a similar view to Figure 6 of a slightly modified link shown therein.

In the drawings, reference numerals 9 and 10 represent the two pads used for the collar. In ordinary collars, the pads are generally continuous and connected at the bottom, whereas in this case, the two pads are made separate and spaced apart at top and bottom. Reference numeral 11 represents the hames with the usual securing strap 12 at the top and an attaching strap 13 at the bottom. At the top end of the collar 9, is riveted, as at 14, the tongue 15. The same rivets also secure a leather strap 16 on the upper side of the collar, the tongue 15 being situated on the under side of the collar. To this tongue 15 is secured a plate 17 as by rivets 18, and this tongue and plate are free on the other end thereof so as to space the gap between the top ends of the pads 9 and 10, as best seen in Figure 2, and slide under the top end of the pad 10.

On the outside of the pad 10 is riveted, or secured in any other suitable manner as at 19, a buckle strap 20 with the buckle 21 intended to cooperate with the strap 16 for adjusting the gap between the top edges of the pads 9 and 10. This provides a suitable adjustment for the necks of different sized horses and it will be evident that the free end 22 of the tongue 15 with the plate 17 will slide down under the upper end of the pad 10 when the strap 16 and buckle 21 are drawn up sufficiently, and that the tongue will thus provide a bearing at the top of the horse's neck. After the width of the gap between the top edges of the pads 9 and 10 has been adjusted for a certain horse, the buckle strap 12 of the hames is drawn up to correspond to the distance made between the pads.

As has already been stated, the lower ends of the pads 9 and 10 are usually connected by the continuation of the two pads across the bottom. In the present case, however, the pads terminate as at 23 and 24, being spaced sufficiently apart to fit either a small or a large horse. To the lower ends of each pad is riveted as at 25, or secured in any other suitable manner, an inner plate 26 and an outer plate 27, which are spaced apart at their free ends to receive between them, a long link 28 and a short link 29 respectively. These links are hinged around pins 30 in the plates 26 and 27 and the long link, extending practically across the opening between the ends 23 and 24 of the pads, is provided with a longitudinal slot 31. This slot is adapted to engage with a loop 32 swiveled as at 33 at the end of the short link 29 in such a manner that when the links are connected, the loop 32 extends through the longitudinal slot 31 of the long link 28 and projects beyond the same to receive the attaching strap 13 for the lower ends of the hames 11. The upper end of the loop 32 is riveted as at 38. At 35 is shown a short longitudinal slot about one and one-fourth to one and one-half inches long, and wide enough to receive a choke strap in the short link 29.

After the width between the top ends of the pads 9 and 10 has been permanently adjusted to a certain horse, this is not supposed to be opened in taking off and putting on the collar. All that has to be done for removing the collar is to open the hame attaching strap 13, when the lower ends 23 and 24 of the pads will come apart after turning the loop 32 so that it will slip through the longitudinal slot 31 in the link 28.

By having the collar open at the bottom and the connection flexible, the collar will never be subjected to such strain as when the parts are solid at this point. It will thus be evident that if an old collar breaks at this point it can be repaired by using the links and plates shown in Figure 3 of these drawings, after the pads have been cut off at the lower ends 23 and 24 and the parts closed by securing the metal plates 26 and 27 at these points. As the bottom of the ordinary collar breaks first at the lower end thereof, it is evident that the life of an old collar can be considerably prolonged by attaching it in the manner described to a collar opened at the bottom. By securing the tongue 15 and the plate 17, as indicated in Figure 2, at the top of the old collar, the necessary adjustment at this point will also be attained.

One advantage of the use of this collar which fits perfectly over the neck of any horse and does not bear heavier on any particular part thereof, is that it prevents sore shoulders and relieves sweeny.

Instead of making parts 26, 27, 28 and 29 of metal plate, it may at times be preferable to use stout leather.

The short link 29 is illustrated in Figure 8 as having an eye 36 instead of the longitudinal slit 35 shown in Figure 6 and this eye is provided with a roller 37. This eye and roller are furnished for the same purpose as the slot 35 in Figure 6, namely, to receive the choke strap. The construction shown in Figure 8 lends itself more readily for links made of metal plate. If, however, it is preferred to use an eye 36 with its roller 37 on a leather strap, the same would naturally be made of metal and riveted onto a leather link 29.

Having thus described the invention, what is claimed as new is:

1. In a collar fastener for a collar comprising a pair of pads, a hinge for each pad, said hinges including inner and outer plates riveted to the pads, links gripped between said plates, radially directed pins between said plates and said links, a slidable connection between said links including a loop pivoted to one of the links, and the other link having a longitudinal slot through which said loop projects.

2. In a collar fastener for a collar comprising a pair of pads having attached thereto a pair of hames adapted to be connected at one end by straps, a hinge for each pad, said hinges including inner and outer plates riveted to the pads, links gripped between said plates, radially directed pins between said plates and said links, a slidable connection between said links including a loop pivoted to one of the links, the other link having a longitudinal slot through which the loop projects and said loop having a projecting portion adapted to receive the straps which connect the hames at one end.

In testimony whereof I affix my signature.

GEORGE R. KELLY. [L. S.]